(12) United States Patent
Lin et al.

(10) Patent No.: US 10,993,206 B2
(45) Date of Patent: Apr. 27, 2021

(54) PAGING SCHEME FOR NEW RADIO TECHNOLOGY IN UNLICENSED SPECTRUM

(71) Applicant: ACER INCORPORATED, New Taipei (TW)

(72) Inventors: Jung-Mao Lin, New Taipei (TW); Chun-Yuan Chiu, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/575,405

(22) Filed: Sep. 19, 2019

(65) Prior Publication Data

US 2020/0100209 A1     Mar. 26, 2020

Related U.S. Application Data

(60) Provisional application No. 62/734,261, filed on Sep. 21, 2018.

(51) Int. Cl.
*H04W 68/02* (2009.01)
*H04W 68/00* (2009.01)
(Continued)

(52) U.S. Cl.
CPC ........... *H04W 68/02* (2013.01); *H04J 3/02* (2013.01); *H04W 4/06* (2013.01); *H04W 8/18* (2013.01); *H04W 76/28* (2018.02)

(58) Field of Classification Search
CPC ......... H04W 72/085; H04W 36/0061; H04W 68/02; H04W 72/0446; H04W 76/27; H04W 68/00; H04W 76/28; H04W 72/005; H04W 76/14; H04W 4/06; H04W 68/005; H04W 84/029; H04W 4/19; H04W 24/08; H04W 52/0229; H04W 4/90; H04W 6/8005; H04W 76/0446; H04W 36/30
(Continued)

(56) References Cited

U.S. PATENT DOCUMENTS 10,231,208 B2 * 3/2019 Agiwal ................. H04B 7/088
10,356,682 B2 * 7/2019 Fasil Abdul .......... H04W 76/10
(Continued)

FOREIGN PATENT DOCUMENTS

TW        201729633 A      8/2017
WO  WO2020032867 A1 *  2/2020

OTHER PUBLICATIONS

"Modeling of LTE DRX in RRC Idle state" Hawar Ramazanali; Alexey Vinel; Emre Yavuz; Magnus Jonsson, Published in: 2017 IEEE 22nd International Workshop on Computer Aided Modeling and Design of Communication Links and Networks (CAMAD) Jun. 2017 (Year: 2017).*

(Continued)

*Primary Examiner* — William D Cumming
(74) *Attorney, Agent, or Firm* — McClure, Qualey & Rodack, LLP

(57) ABSTRACT

A paging method for a user equipment in an NR-U system is provided, wherein the user equipment is configured with a paging monitor window comprising paging plurality of monitor occasions. The paging method includes determining locations of the plurality of monitor occasions based on at least one NRUP rule; and receiving a paging message at the plurality of monitor occasions within the paging monitor window.

16 Claims, 17 Drawing Sheets

(51) Int. Cl.
  *H04W 4/90* (2018.01)
  *H04W 76/27* (2018.01)
  *H04W 76/28* (2018.01)
  *H04W 36/30* (2009.01)
  *H04J 3/02* (2006.01)
  *H04W 4/06* (2009.01)
  *H04W 8/18* (2009.01)

(58) Field of Classification Search
  USPC ............... 455/422.1, 458; 370/311, 312, 329
  See application file for complete search history.

(56) References Cited

U.S. PATENT DOCUMENTS

| | | | | |
|---|---|---|---|---|
| 10,455,508 | B2* | 10/2019 | Chen | H04W 68/02 |
| 10,694,493 | B2* | 6/2020 | Yerramalli | H04B 1/7143 |
| 2006/0040681 | A1* | 2/2006 | Julka | H04W 68/02 455/458 |
| 2010/0110956 | A1* | 5/2010 | Hepworth | H04W 4/90 370/312 |
| 2010/0202382 | A1 | 8/2010 | Park | |
| 2013/0039287 | A1* | 2/2013 | Rayavarapu | H04W 76/28 370/329 |
| 2013/0051301 | A1* | 2/2013 | Xu | H04W 72/005 370/312 |
| 2013/0182626 | A1 | 7/2013 | Kuo | |
| 2013/0260740 | A1* | 10/2013 | Rayavarapu | H04W 76/27 455/422.1 |
| 2016/0050626 | A1* | 2/2016 | Chen | H04W 52/0225 370/311 |
| 2017/0367069 | A1* | 12/2017 | Agiwal | H04B 7/0695 |
| 2018/0176847 | A1* | 6/2018 | Fasil Abdul | H04W 36/30 |
| 2018/0199388 | A1* | 7/2018 | Tabet | H04W 72/0446 |
| 2018/0242276 | A1 | 8/2018 | Patel | |
| 2018/0317198 | A1* | 11/2018 | Lee | H04W 68/005 |
| 2018/0343617 | A1* | 11/2018 | Siann | H04W 68/00 |
| 2018/0376501 | A1* | 12/2018 | John Wilson | H04W 72/0446 |
| 2019/0007925 | A1* | 1/2019 | Frenger | H04L 5/0048 |
| 2019/0028999 | A1* | 1/2019 | Yerramalli | H04B 1/7143 |
| 2019/0090190 | A1* | 3/2019 | Liu | H04W 52/0229 |
| 2019/0090191 | A1* | 3/2019 | Liu | H04W 52/0235 |
| 2019/0159165 | A1* | 5/2019 | Agiwal | H04B 7/088 |
| 2019/0223147 | A1* | 7/2019 | Chen | H04W 68/005 |
| 2019/0239189 | A1* | 8/2019 | Hwang | H04W 52/0229 |
| 2019/0313428 | A1* | 10/2019 | Zhou | H04J 11/0069 |
| 2019/0313434 | A1* | 10/2019 | Zhou | H04W 72/1289 |
| 2019/0342813 | A1* | 11/2019 | Fasil Abdul | H04J 11/0093 |
| 2019/0342853 | A1* | 11/2019 | Li | H04W 68/02 |
| 2020/0053645 | A1* | 2/2020 | Charbit | H04W 68/10 |
| 2020/0084717 | A1* | 3/2020 | Hoglund | H04W 68/02 |
| 2020/0100209 | A1* | 3/2020 | Lin | H04W 8/18 |

OTHER PUBLICATIONS

ZTE, Discussion on paging operation in NR-U, 3GPP TSG-RAN WG2 NR AH1807 Meeting, Jul. 2-6, 2018, Montreal, Canada, R2-1809839, XP051467091.

Nokia et al., Paging operation in unlicensed spectrum, 3GPP TSG-RAN WG2 Meeting #AH-1807, Jul. 2-6, 2018, Montreal, Canada, R2-1810210, R2-1807124, XP051467403.

Interdigital Inc., On Initial Access for NR Unlicensed Spectrum, 3GPP TSG RAN WG1 Meeting #93, May 21-25, 2018, pp. 1/6-6/6, Busan, South Korea, R1-1807037, XP051442235.

Spreadtrum Communications, Remaining issues on paging design, 3GPP TSG RAN WG1 Meeting #92, Feb. 26-Mar. 2, 2018, Athens, Greece, R1-1801838, XP051396889.

* cited by examiner

PAGING SCHEME FOR NEW RADIO TECHNOLOGY IN UNLICENSED SPECTRUM

CROSS REFERENCE TO RELATED APPLICATIONS

This application claims the benefit of U.S. Provisional Application No. 62/734,261, filed on Sep. 21, 2018, the contents of which are incorporated herein.

BACKGROUND OF THE INVENTION

1. Field of the Invention

The present invention relates to a paging method, and more particularly, to a paging method for multiple paging monitor windows in a new radio technology in unlicensed spectrum stand alone system.

2. Description of the Prior Art

Paging scheme in a licensed band system introduces that a user equipment (UE) may monitor only one monitor occasion (MO) in one Discontinuous Reception (DRX) cycle, wherein the licensed band system may be a long term evolution (LTE) system or a New Radio technology (NR) system.

The UE may use an identifier to receive a paging message (PM) at the monitored MO. The identifier is a paging radio network temporary identifier (P-RNTI) having a uniquely specified value (e.g., FFFF) in the licensed band system. One paging frame (PF) corresponds to one radio frame (RF) and contains at least one MO, and the length of one MO is one slot/subframe. The UE may derive the PF and the MO based on the P-RNTI during the DRX cycle.

As considering the paging scheme in an NR Unlicensed Spectrum (NR-U) Stand Alone (SA) system, the probability of a next Generation Node B (gNB) being able to transmit PMs may be reduced due to a rule of Listen Before Talk (LBT). Therefore, multiple paging transmission opportunities per DRX cycle are allowed for the UE in the NR-U system; for example, the UE should consider both time division multiplexing and frequency division multiplexing when monitoring the MO.

Paging monitor window (PMW) is a monitor window for the UE to receive PM in each DRX cycle. The length of one PMW is one MO in the legacy paging scheme, while the length of one PMW is one MO plus one additional occasion (AO) in the paging scheme for the NR-U SA system. If the gNB fails to deliver one PM on a MO due to LBT, the gNB reattempts channel acquisition in the AO. Corresponding, the UE may need to monitor the AO for paging message.

Therefore, there is a need to provide a paging method in the NR-U SA system.

SUMMARY OF THE INVENTION

It is therefore an objective of the present invention to provide a paging method in a new radio technology in new radio unlicensed spectrum stand alone system.

The present invention discloses a paging method for a user equipment in a NR-U (New Radio Unlicensed spectrum) system, wherein the user equipment is configured with a paging monitor window comprising a plurality of monitor occasions. The monitor occasion (MO) is an occasion for UE receiving paging message. For example, the MO may be a time occasion or a monitor occasion in legacy system. The paging method includes determining locations of the plurality of monitor occasions; and receiving a paging message at the plurality of monitor occasions within the paging monitor window.

The present invention may be categorized into first, second, and third embodiments. In the first embodiment, the use of additional paging frame and additional monitor occasion for NRUP (New Radio Unlicensed spectrum Paging) is disclosed. In the second embodiment, the use of one or more P-RNTI (Paging Radio Network Temporary Identifiers) under overlapping paging monitor windows is disclosed. In the third embodiment, the use of additional paging message indicator under overlapping paging monitor windows is disclosed.

These and other objectives of the present invention will no doubt become obvious to those of ordinary skill in the art after reading the following detailed description of the preferred embodiment that is illustrated in the various figures and drawings.

DETAILED DESCRIPTION

Abbreviations are listed as below, applied to all of the description, claims and figures of the present application.

Figure 2:
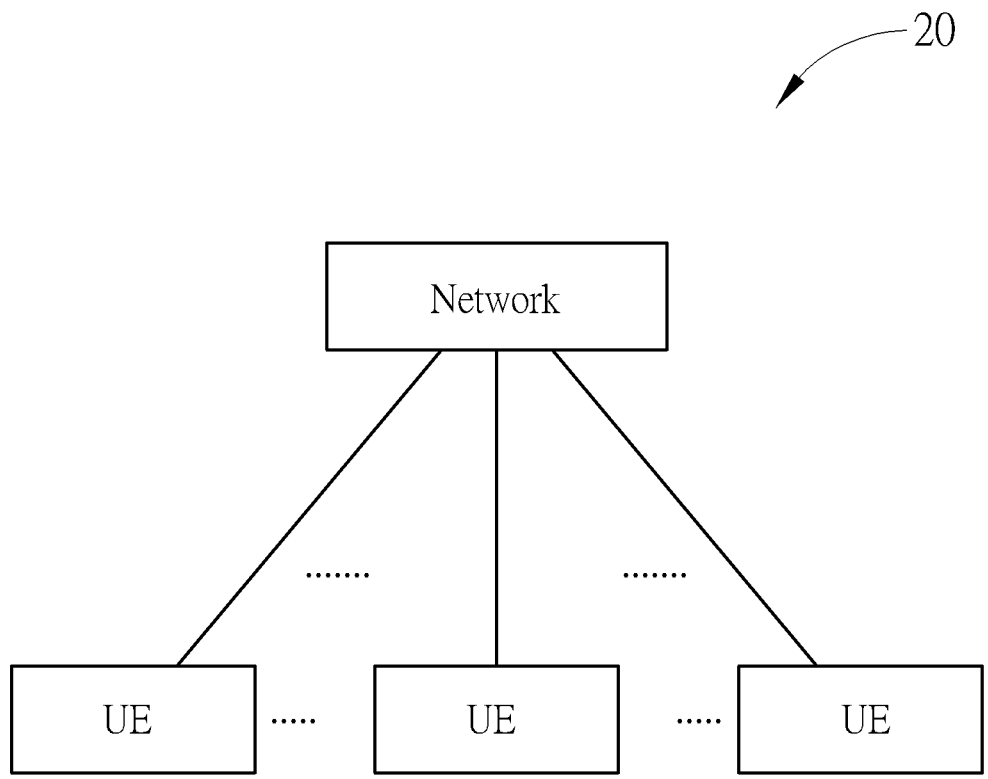
FIG. 2 is a schematic diagram of a wireless communication system according to an embodiment of the present invention.

NR-U SA New Radio technology in Unlicensed spectrum Stand Alone
LTE Long-Term Evolution
UE User Equipment
E-UTRAN Evolved Universal Terrestrial Radio Access Network
eNB Evolved Node B
gNB new generation Node B
UL Uplink
DL Downlink
PMW Paging Monitor Window
NR New Radio
PF Paging Frame
iPF initial Paging Frame
aPF additional paging frame
iMO initial monitor occasion
aMO additional monitor occasion
3GPP Third Generation Partnership Project
NRUP New Radio Unlicensed spectrum Paging
PM Paging Message
iPM initial Paging Message
aPM additional Paging Message
PR Paging Record
SFN System Frame Number Please refer to FIG. 2, which is a schematic diagram of a wireless communication system 20. The wireless communication system 20 may be an NR-U SA system, an LTE system, a fifth-generation (5G) communication system, or other mobile communication systems, and is briefly composed of a network and a plurality of UEs. In FIG. 2, the network and the UEs are simply utilized for illustrating the structure of the wireless communication system 20. Practically, the network in the 5G communication system may be a gNB, and the network in the E-UTRAN system may be an eNB. The UEs may be devices such as mobile phones, computer systems, etc. In addition, the network and the UE may be seen as a transmitter or receiver according to transmission direction, e.g., for UL, the UE is the transmitter and the network is the receiver, and for DL, the network is the transmitter and the UE is the receiver.

Figure 3:
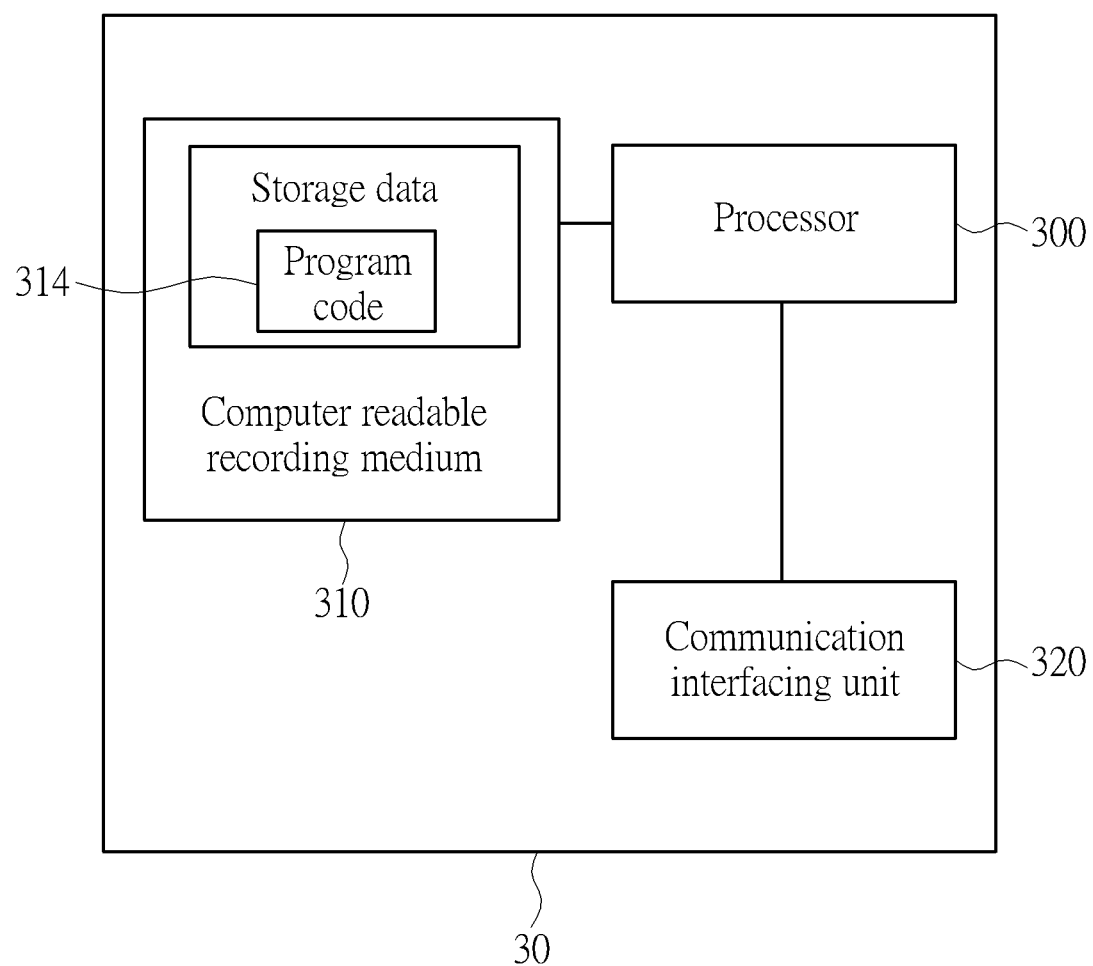
FIG. 3 illustrates a schematic diagram of an exemplary communication device according to an embodiment of the present invention.

Please refer to FIG. 3, which illustrates a schematic diagram of an exemplary communication device 30. The communication device 30 may be the UE shown in FIG. 2, but is not limited herein. The communication device 30 may include a processor 300 such as a microprocessor or Application Specific Integrated Circuit (ASIC), a computer readable recording medium 310 and a communication interfacing unit 320. The computer readable recording medium 310 may be any data storage device that can store program code 314, for access by the processor 300. Examples of the computer readable recording medium 310 include but are not limited to a subscriber identity module (SIM), read-only memory (ROM), flash memory, random-access memory (RAM), CD-ROMs, magnetic tape, hard disk, and optical data storage device. The communication interfacing unit 320 is preferably a radio transceiver and can exchange wireless signals with the network according to processing results of the processor 300.

Figure 4:
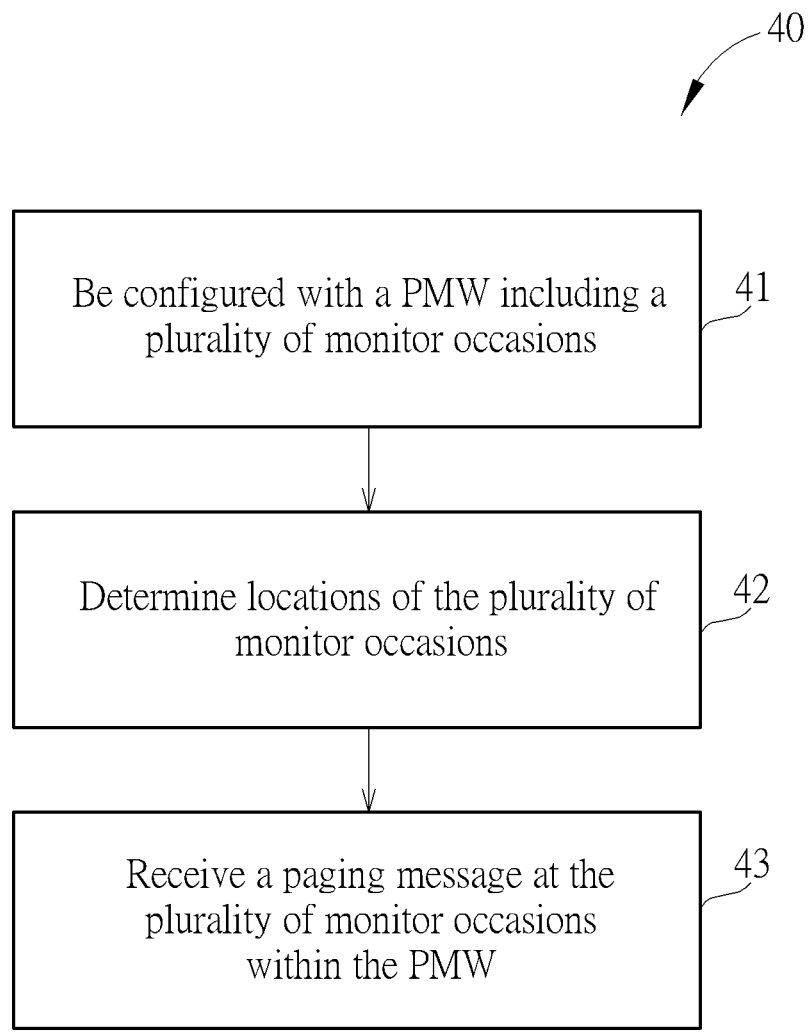
FIG. 4 illustrates a flowchart of an exemplary process according to an embodiment of the present invention.

Please refer to FIG. 4, which illustrates a flowchart of an exemplary process 40 according to an embodiment of the present invention. The process 40 is utilized in a UE of a wireless communication system for monitor occasion calculation. The process 40 may be compiled into the program code 314 and includes the following steps:

Step 41: Be configured with a PMW including a plurality of monitor occasions.

Step 42: Determine locations of the plurality of monitor occasions.

Step 43: Receive a paging message at the plurality of monitor occasions within the PMW.

Figure 5:
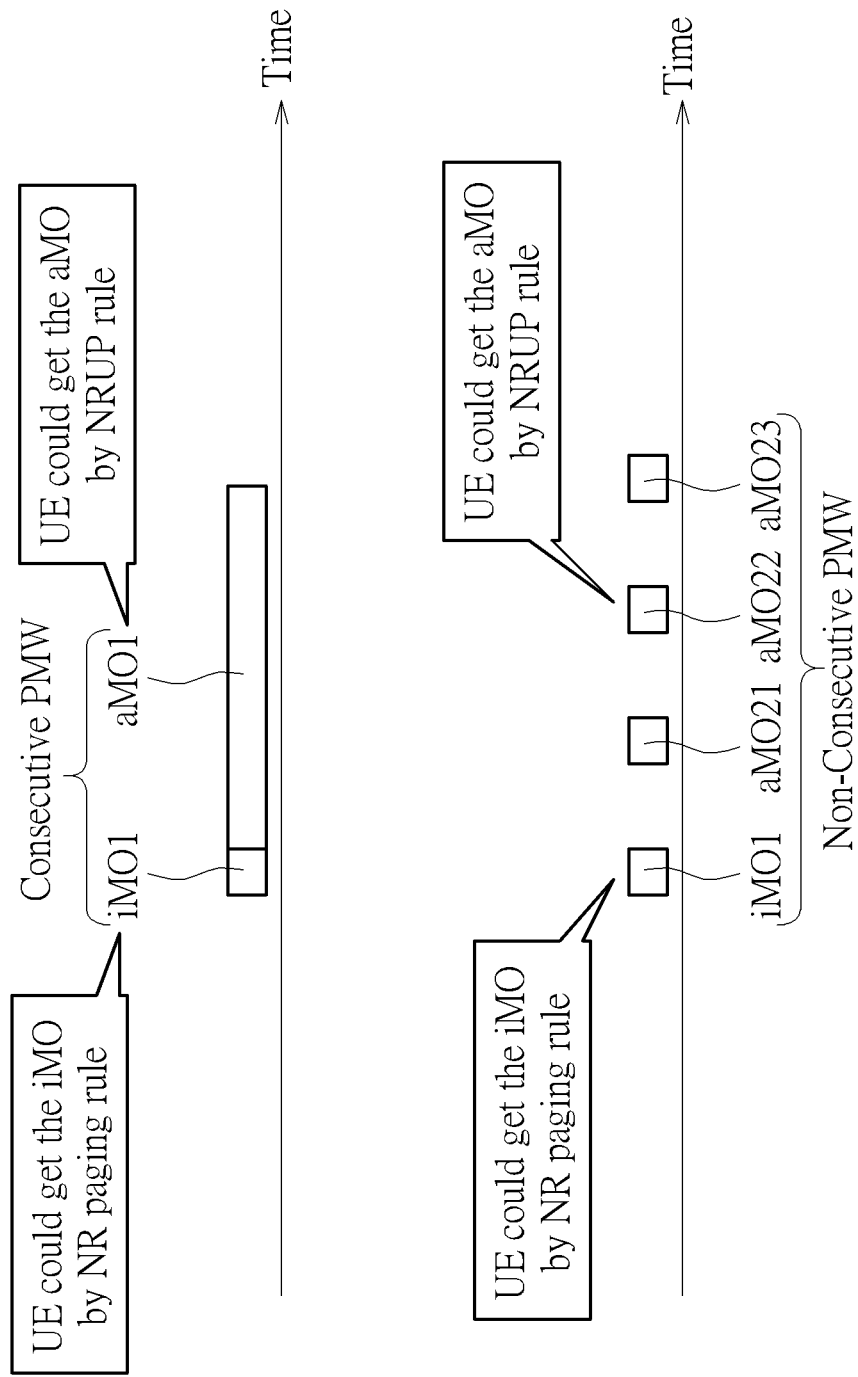
FIG. 5 illustrates a monitor occasion configuration for a consecutive PMW and a non-consecutive PMW according to the first embodiment of the present invention.

To explain the process 40, please also refer to FIG. 5, which illustrates a monitor occasion configuration for a consecutive PMW and a non-consecutive PMW according to the first embodiment of the present invention. In Step 41, the UE may be configured with the consecutive PMW including a plurality of monitor occasions. The monitor occasion (MO) is an occasion for UE receiving paging message. For example, the MO may be a time occasion or a monitor occasion in legacy system. For example, one of the plurality of monitor occasions may be an initial monitor occasion iMO1, and another one of the plurality of monitor occasions may be an additional monitor occasion aMO1. The initial monitor occasion iMO1 is a starting point of the consecutive PMW, the additional monitor occasion aMO1 starts after the initial monitor occasion iMO1, and the monitor occasions iMO1 and aMO1 are configured at consecutive paging frames.

In Step 42, the UE may use NR paging rules to determine locations of an iPF and the initial monitor occasion iMO1, wherein the iPF is a radio frame including a slot/subframe carrying the initial monitor occasion iMO1. The NR paging rules are specified in 3GPP standards, which are omitted for brevity. In Step 43, the UE may use NRUP rules to determine locations of an aPF and the additional monitor occasion aMO1, wherein the aPF is a radio frame including a slot/subframe carrying the additional monitor occasion aMO1.

In another case, in Step 41, the UE may be configured with the non-consecutive PMW including a plurality of monitor occasions. For example, one of the plurality of monitor occasions may be an initial monitor occasion iMO2, and another one of the plurality of monitor occasions may be one or more additional monitor occasions aMO21, aMO22, and aMO23. The initial monitor occasion iMO2 is a starting point of the non-consecutive PMW, the additional monitor occasions aMO21, aMO22, and aMO23 start after the initial monitor occasion iMO2, and the monitor occasions iMO2, aMO21, aMO22, and aMO23 are carried by non-consecutive monitor frames. The UE may use NR paging rules to determine locations of an iPF and the initial monitor occasion iMO2, wherein the iPF is a radio frame including a slot/subframe carrying the initial monitor occasion iMO2. The NR paging rules are specified in 3GPP standards, which are omitted. The UE may use NRUP rules to determine locations of aPFs and the additional monitor occasions aMO21, aMO22, and aMO23, wherein the aPFs are radio frames including slots/subframes carrying the additional monitor occasions aMO21, aMO22, and aMO23, respectively.

Figure 6:
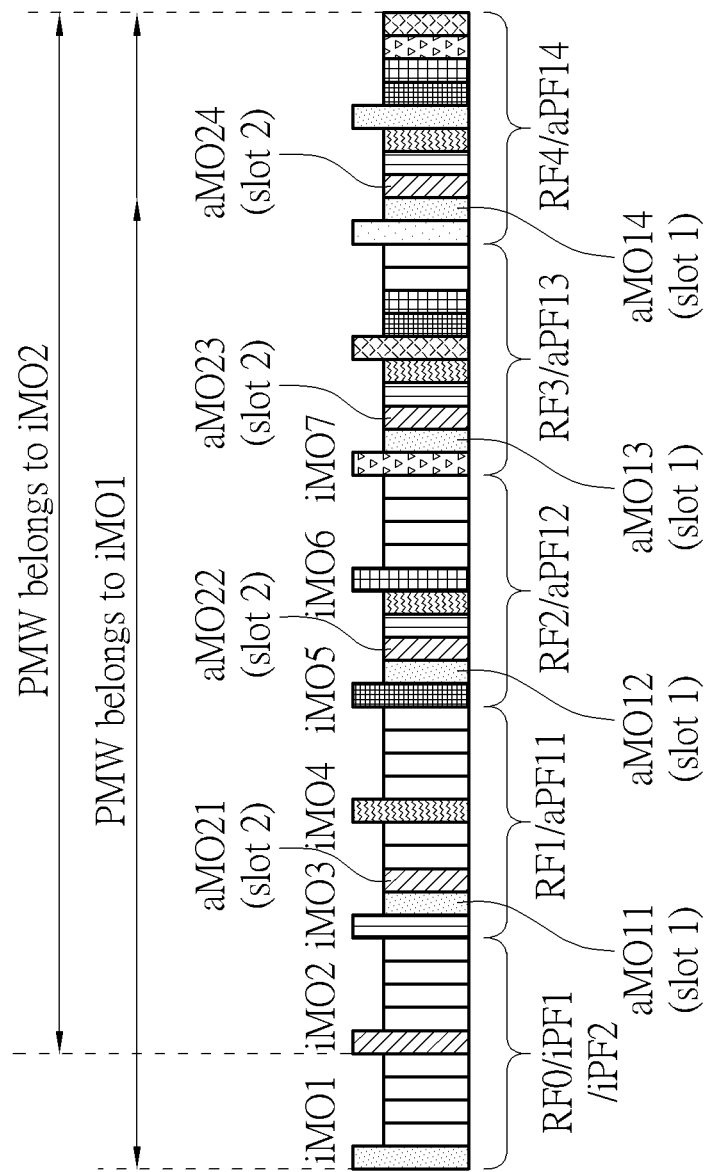
FIG. 6 illustrates a monitor occasion configuration according to the first embodiment of the present invention.

FIG. 6 illustrates a monitor occasion configuration according to the first embodiment of the present invention. In an example of the first embodiment, the possible location of an aMO is a slot/subframe which is not configured for an iMO. For example, an initial paging frame iPF1 includes 10 slots, slot 0 and slot 5 are respectively configured for initial monitor occasions iMO1 and iMO2, and slot 1, slot 2, slot 3, slot 4, slot 6, slot 7, slot 8 and slot 9 are possible locations configured for the aMO, and the same as to the radio frames RF1, RF2, RF3, and RF4.

In an example of the first embodiment, aMOs within a PMW associated with different iMOs are not overlapped. Since there is only one monitor occasion occurring at only one slot, the number of PRs may not exceed the maximum number (e.g., 32) in a PM contained in the only one monitor occasion. For example, additional monitor occasions aMO11, aMO12, aMO13 and aMO14 associated with the initial monitor occasion iMO1 are not overlapped with additional monitor occasions aMO21, aMO22, aMO23 and aMO24 associated with the initial monitor occasion iMO2.

In an example of the first embodiment, the maximum number of aPFs is dependent on how many available occasions could be allocated between two consecutive iMOs. For example, when the maximum number of available occasions between two consecutive initial monitor occasions is 4, the maximum number of aPFs is 4 for each iMO, and the gNB may configure four additional paging frames aPF11, aPF12, aPF13 and aPF14 associated with the initial paging frame iPF1.

In an example of the first embodiment, the available occasions between two consecutive iMOs are assigned to aMOs associated with one or more earlier iMO. For example, the available occasions between two consecutive initial monitor occasions iMO3 and iMO4 are assigned to the additional monitor occasions aMO11 and aMO21 associated with the earlier initial monitor occasions iMO1 and iMO2.

In an example of the first embodiment, the gNB may allocate aMOs associated with the same initial monitor occasion at a same location of their additional paging frames. In other words, the UE may determine the one or more monitor occasion respectively located at one or more slot with a same slot index of one or more radio frames. For example, the additional monitor occasions aMO11, aMO12, aMO13 and aMO14 associated with the same initial monitor occasion iMO1 may be allocated at slot 1 of the additional paging frames aPF11, aPF12, aPF13 and aPF14. For different initial monitor occasions, the locations of aMOs are staggered based on the index of initial monitor occasion in a paging frame and the SFN of an initial paging frame. For example, the additional monitor occasions aMO21, aMO22, aMO23 and aMO24 associated with the same initial monitor occasion iMO2 may be allocated at slot 2 of the additional paging frames aPF11, aPF12, aPF13 and aPF14 based on its index 2.

In an example of the first embodiment, the UE may firstly use a formula to calculate the location of the additional paging frames. For example, the additional paging frames may locate at most: (Floor [(n*T)/(d*nB)]−1) radio frames after the initial paging frame configured for the UE, wherein:

n is a total number of slots within a radio frame,
d is a duration of a monitor occasion,
T is a DRX cycle,
nB is a total number of initial monitor occasions in T,
n*T is total duration of T,
d*nB is a total duration of total initial monitor occasions, and
Floor[(n*T)/(d*nB)] is the maximum number of monitor occasions (i.e., iMO+aMO) for a UE in T.

The UE may secondarily use a formula to calculate the location of the aMOs. For example, the aMOs may start from the slot with a number equal to:

$$\{i\_s*P+\text{Offset}+d+d*\{(\text{SFN of UE's iPF}) \bmod \text{floor}[(n/d)*(T/nB)-1]\}\} \bmod n, \text{ wherein:}$$

i_s is an index of an initial monitor occasion in a radio frame,
d is a duration of the initial monitor occasion,
P is a Periodicity of the initial monitor occasion in a radio frame, and
Offset is the first slot of the first initial monitor occasion in the radio frame.

Figure 7:
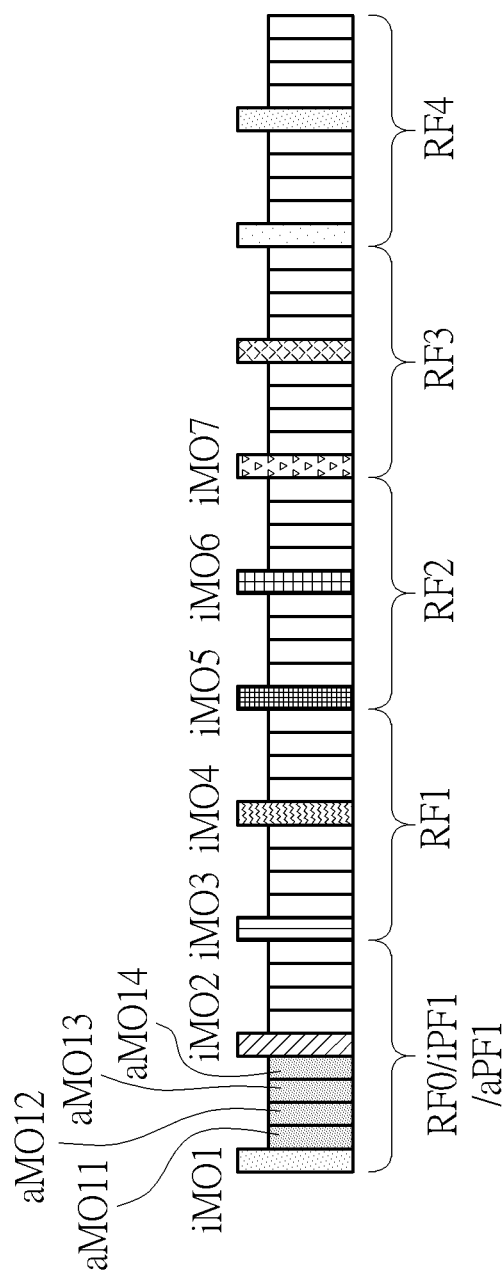
FIG. 7 illustrates a monitor occasion configuration according to the first embodiment of the present invention.

FIG. 7 illustrates a monitor occasion configuration according to the first embodiment of the present invention. A radio frame RF0 is an initial paging frame iPF1 carrying an initial monitor occasion iMO1. The radio frame RF0 is also an additional frame aPF1 carrying additional monitor occasions aMO11, aMO12, aMO13 and aMO14 associated with the initial monitor occasion iMO1. In an example of the first embodiment, the additional monitor occasions aMO11, aMO12, aMO13 and aMO14 associated with the same initial monitor occasion iMO1 are tightly following the initial monitor occasion iMO1. In other words, the UE may determine the one or more additional monitor occasion respectively located at one or more slot of a radio frame carrying the initial monitor occasion, wherein the one or more additional monitor occasion is tightly following the initial monitor occasion. There will not have other iMO configured between the iMO1 and the aMOs associated with the iMO1. For example, when the initial monitor occasion iMO1 is located at slot 0 of the initial paging frame iPF1, the additional monitor occasions aMO11, aMO12, aMO13 and aMO14 are respectively located at slot 1, slot 2, slot 3 and slot 4 of the initial paging frame iPF1.

In an example of the first embodiment, before determining the one or more additional monitor occasion located at the one or more slot, the UE is configured with a number of the one or more additional monitor occasion, wherein the number of the one or more additional monitor occasion is not greater than available occasions that could be allocated between two consecutive initial monitor occasions in the radio frame. For example, the UE is configured with the number of the additional monitor occasion aMO11, aMO12, aMO13 and aMO14 being 4, which is not greater than available occasions that could be allocated between the two consecutive initial monitor occasions iMO1 and iMO2.

Figure 8:
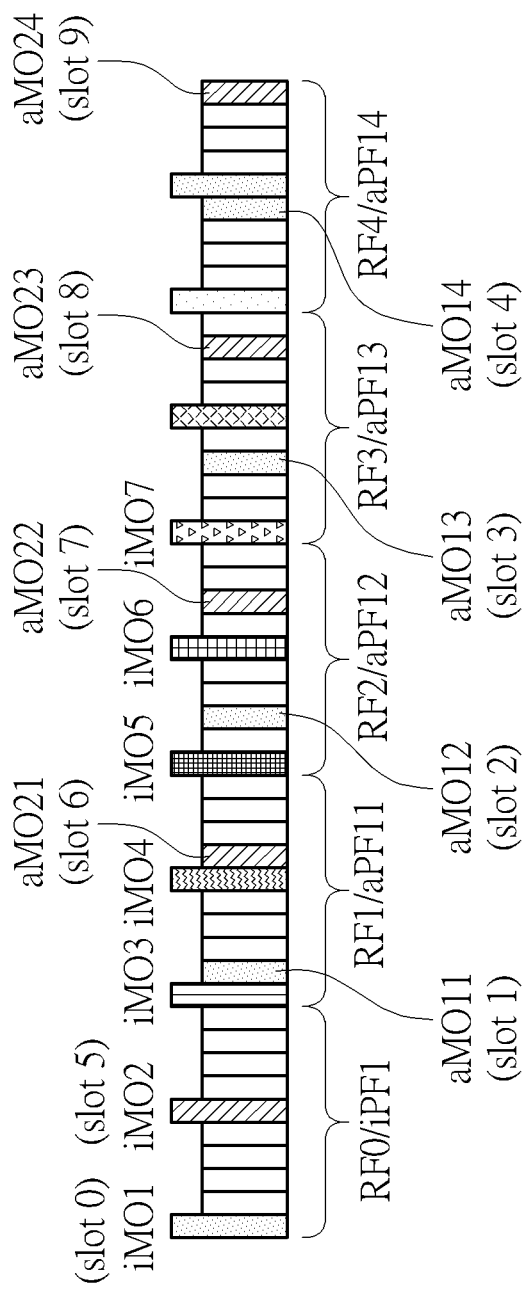
FIG. 8 illustrates a monitor occasion configuration according to the first embodiment of the present invention.

FIG. 8 illustrates a monitor occasion configuration according to the first embodiment of the present invention. A radio frame RF0 is an initial paging frame iPF1 carrying an initial monitor occasion iMO1. Radio frames RF1, RF2, RF3 and RF4 are additional frames aPF11, aPF12, aPF13 and aPF14 carrying additional monitor occasions aMO11, aMO12, aMO13 and aMO14 associated with the initial monitor occasion iMO1. The initial paging frame iPF1 also carries an initial monitor occasion iMO2. The additional frames aPF11, aPF12, aPF13 and aPF14 also carry additional monitor occasions aMO21, aMO22, aMO23 and aMO24 associated with the initial monitor occasion iMO2. There will be other initial monitor occasions iMO2 and iMO3 configured between the initial monitor occasion iMO1 and the additional monitor occasion aMO1 associated with the initial monitor occasion iMO1.

In an example of the first embodiment, the location of a following aMO may relate to the location of a previous aMO. In an example of the first embodiment, for all aMOs associated with the same initial monitor occasion, the locations of the aMOs within the radio frames may not be the same. In an example of the first embodiment, the slot index of aMO may be the next slot index of a previous MO (iMO or aMO) in the next aPF.

The UE may determine a next one of the plurality of monitor occasions located at a slot with a slot index that is next to a previous slot index of a previous one of the plurality of monitor occasions. For example, when the initial monitor occasion iMO1 is at slot 0 of the initial paging frame iPF1, then the first additional monitor occasion aMO11 is at slot 1 of the additional paging frame aPF11, the second additional monitor occasion aMO12 is at slot 2 of the additional paging frame aPF12, the third additional monitor occasion aMO13 is at slot 3 of the additional paging frame aPF13, and the fourth additional monitor occasion aMO14 is at slot 4 of the additional paging frame aPF14. For example, when the initial monitor occasion iMO2 is at slot 5 of the initial paging frame iPF1, then the first additional monitor occasion aMO21 is at slot 6 of the additional paging frame aPF11, the second additional monitor occasion aMO22 is at slot 7 of the additional paging frame aPF12, the third additional monitor occasion aMO23 is at slot 8 of the additional paging frame aPF13, and the fourth additional monitor occasion aMO24 is at slot 9 of the additional paging frame aPF14. The UE may need to monitor paging messages only at the configured monitor occasions iMO1, aMO11, aMO12, aMO13, aMO14, iMO2, aMO21, aMO22, aMO23 and aMO24.

PMWs belong to different POs should overlap in a time duration to increase the paging capacity for the NR-U SA system, wherein the paging capacity means the number of UEs capable of being paged by the gNB during the time duration. However, one PM in a PO could carry a limit number of paging records (PRs), for example, one PM could carry at most 32 PRs and each PR corresponds to a paged UE.

Figure 1:
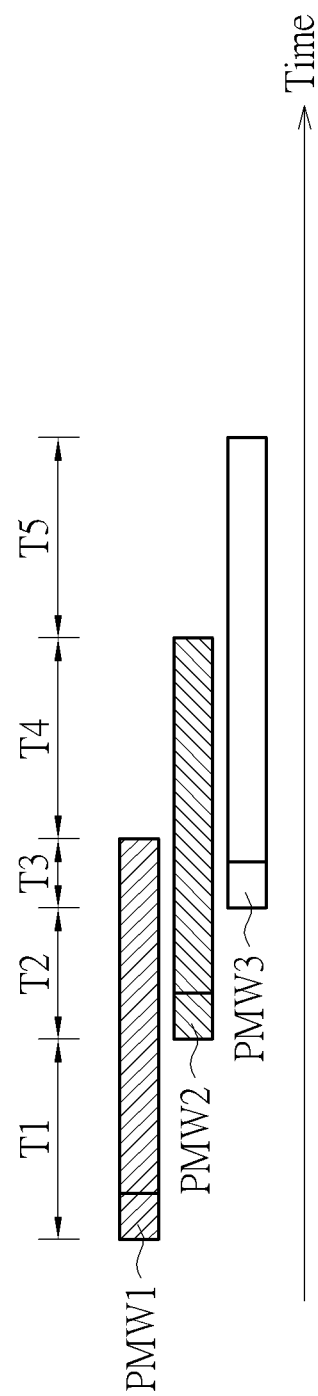
FIG. 1 illustrates a schematic diagram of overlapping paging monitor windows according to an embodiment of the present invention.

FIG. 1 illustrates a schematic diagram of overlapping PMWs according to an embodiment of the present invention. There are consecutive paging monitor windows PMW1, PMW2 and PMW3 overlapping in a time duration, wherein the time duration may be divided into five intervals T1, T2, T3, T4 and T5.

The PM within the interval T1 may carry the PRs of the PMW1; the PM within the interval T2 may carry the PRs of the PMW1 and PMW2; the PM within the interval T3 may carry the PRs of the PMW1, PMW2 and PMW3; the PM within the interval T4 may carry the PRs of the PMW2 and PMW3; and the PM within the interval T5 may carry the PRs of the PMW3. Applicant notices that in the intervals T2, T3 and T4, the total number of PRs in the PMs of the PMW1, PMW2 and PMW3 may exceed the maximum number of the PR (i.e., 32). In order to maximize the paging capacity within the maximum number of the PR, there is a need to provide a paging method in the NR-U SA system.

Figure 9:
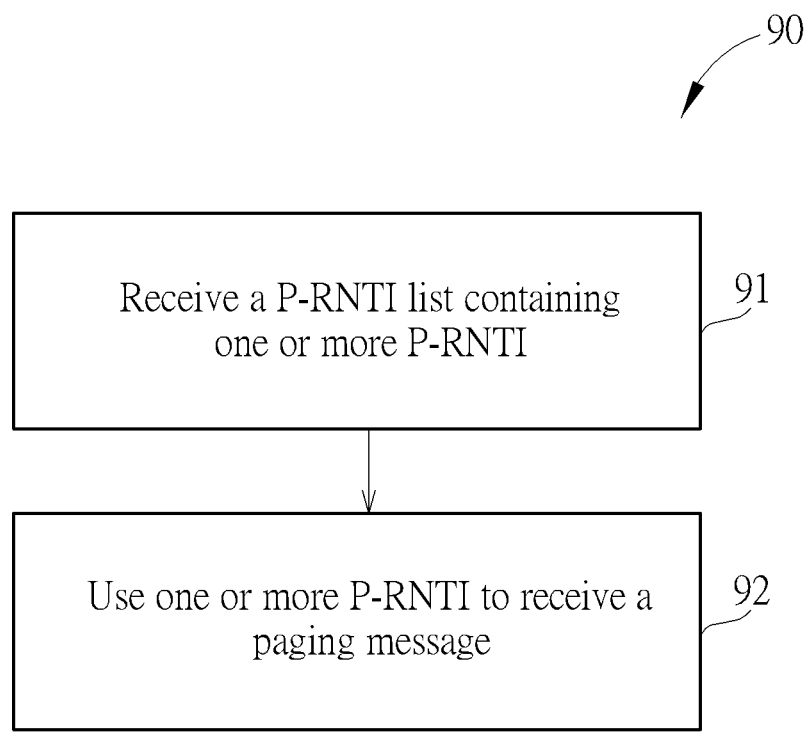
FIG. 9 illustrates a flowchart of an exemplary process according to an embodiment of the present invention.

Please refer to FIG. 9, which illustrates a flowchart of an exemplary process 90 according to a second embodiment of the present invention. The process 90 is utilized in a UE of a wireless communication system for paging message reception. The process 90 may be compiled into the program code 314 and includes the following steps:

Step 91: Receive a P-RNTI list containing one or more P-RNTI.

Step 92: Use one or more P-RNTI to receive a paging message.

Figure 10:
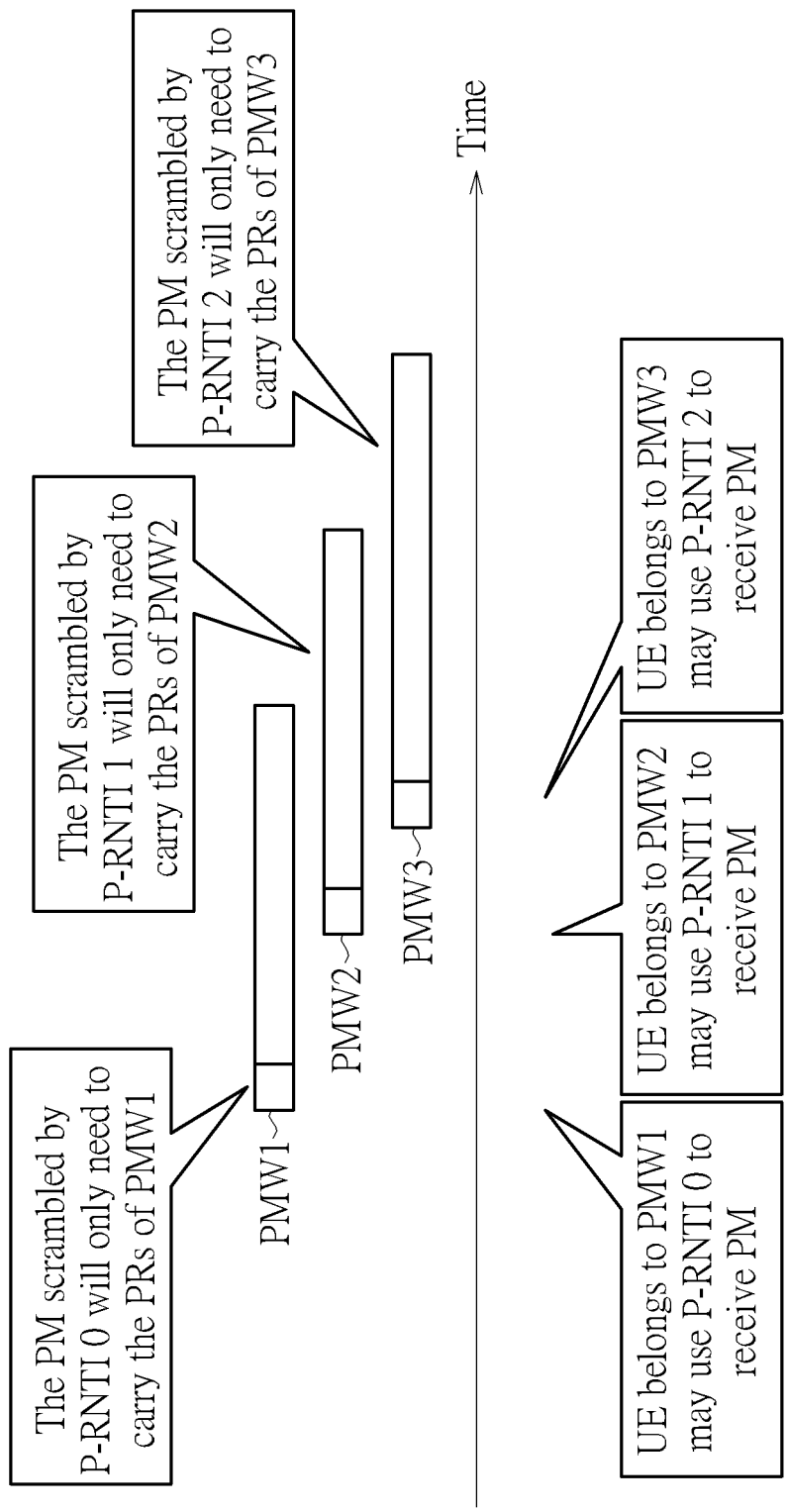
FIG. 10 illustrates a paging message reception scheme under a plurality of overlapping PMWs according to a second embodiment of the present invention.

To explain the process 90, please also refer to FIG. 10, which illustrates a paging message reception scheme under a plurality of overlapping PMWs according to the second embodiment of the present invention. Multiple paging monitor windows PMW1, PMW2 and PMW3 are overlapped, the UE may use one or more P-RNTI to receive a paging message, and see if its identity is contained in a paging record list carried by the paging message.

In Step 91, the UE may receive a P-RNTI list containing one or more P-RNTI with indexes 0, 1 and 2. The gNB may provide the P-RNTI list containing one or more P-RNTI that could be used by the UE to receive the paging message. In an example of the second embodiment, the one or more P-RNTI is preconfigured, configured by a received broadcast message, or configured by a received unicast message, and the one or more P-RNTI is included in a received P-RNTI list.

In Step 92, the UE may use one or more P-RNTI with indexes 0, 1 and 2 to receive a paging message. For example, the UE configured with the paging monitor window PMW1 may use the P-RNTI with index 0 to receive the paging message, the UE configured with the paging monitor window PMW2 may use the P-RNTI with index 1 to receive the paging message, and the UE configured with the paging monitor window PMW3 may use the P-RNTI with index 2 to receive the paging message.

The UE may determine which P-RNTI should be used to receive the paging message based on information related to its paging monitor window. For example, when the P-RNTI list contains three P-RNTIs with indexes 0, 1 and 2, the UE configured with the paging monitor window PMW1 may use the P-RNTI with an index corresponding to (iMO1 index mod 3) to receive the paging message, which is not limited.

The index of initial monitor occasion may be used to differentiate different overlapping PMWs.

For example, the index of PMW may be:

$(i\_s + d * \text{SFN of UE's iPF})$, wherein i_s is the index of the PMW in a radio frame,
d is a duration of the initial monitor occasion.

The paging message scrambled by the P-RNTI with index 0 may only carry paging records of the paging monitor window PMW1, the paging message scrambled by the P-RNTI with index 1 may only carry paging records of the paging monitor window PMW2, and the paging message scrambled by the P-RNTI with index 2 may only carry paging records of the paging monitor window PMW3. Paging records associated with different PMWs may not be carried in the same paging message. For example, the paging message derived from the paging monitor window PMW1 carries the paging records only associated with the paging monitor window PMW1.

Further, the gNB may depend on the degree of PMW overlapping to decide the number of P-RNTIs. For example, the gNB may configure more P-RNTIs for the UEs when there are more overlapping PMWs at a same duration.

Figure 11:
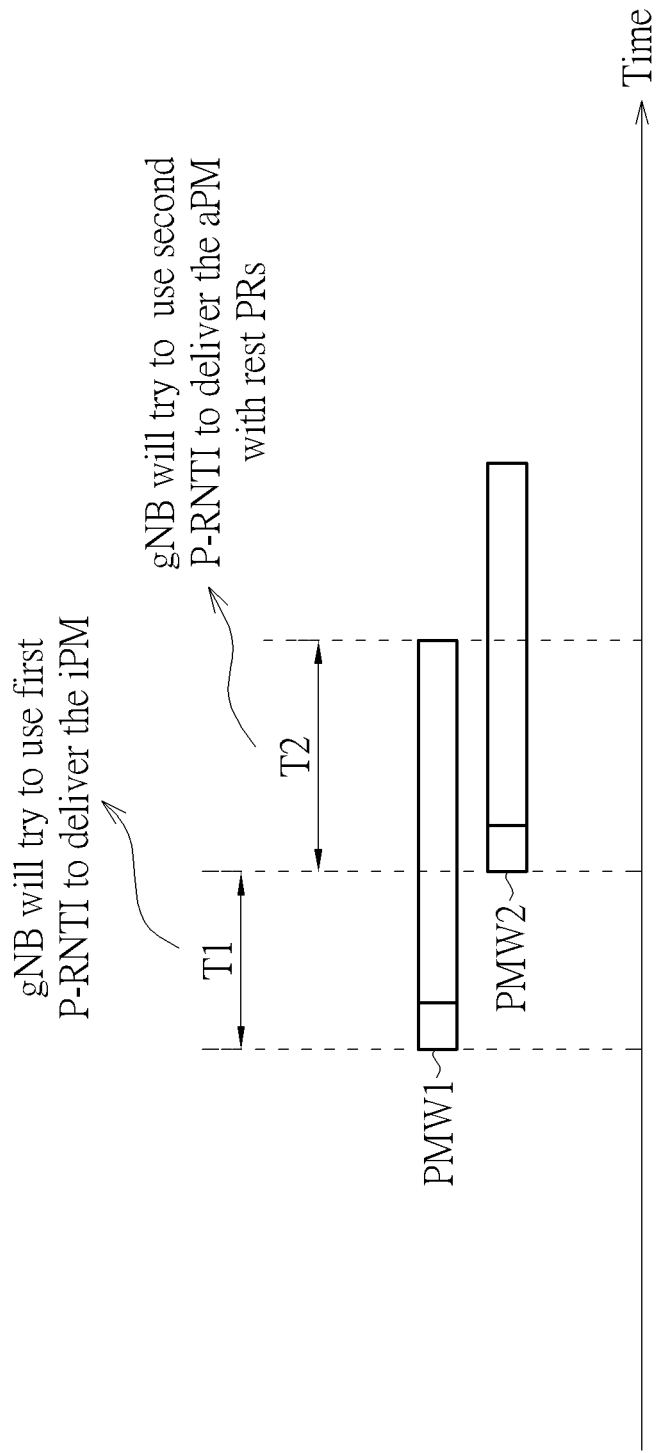
FIG. 11 illustrates a paging message reception scheme under a plurality of overlapping PMWs according to a third embodiment of the present invention.

FIG. 11 illustrates a paging message reception scheme under a plurality of overlapping PMWs according to a third embodiment of the present invention. At a time interval T1, a paging monitor window PMW1 does not overlap with any paging monitor window; at a time interval T2, the paging monitor window PMW1 overlaps with a paging monitor window PMW2. In the third embodiment, a PM may contain an aPM indicator under overlapping paging monitor windows, therefore the UE may determine whether to receive an aPM based on the aPM indicator.

Figure 12:
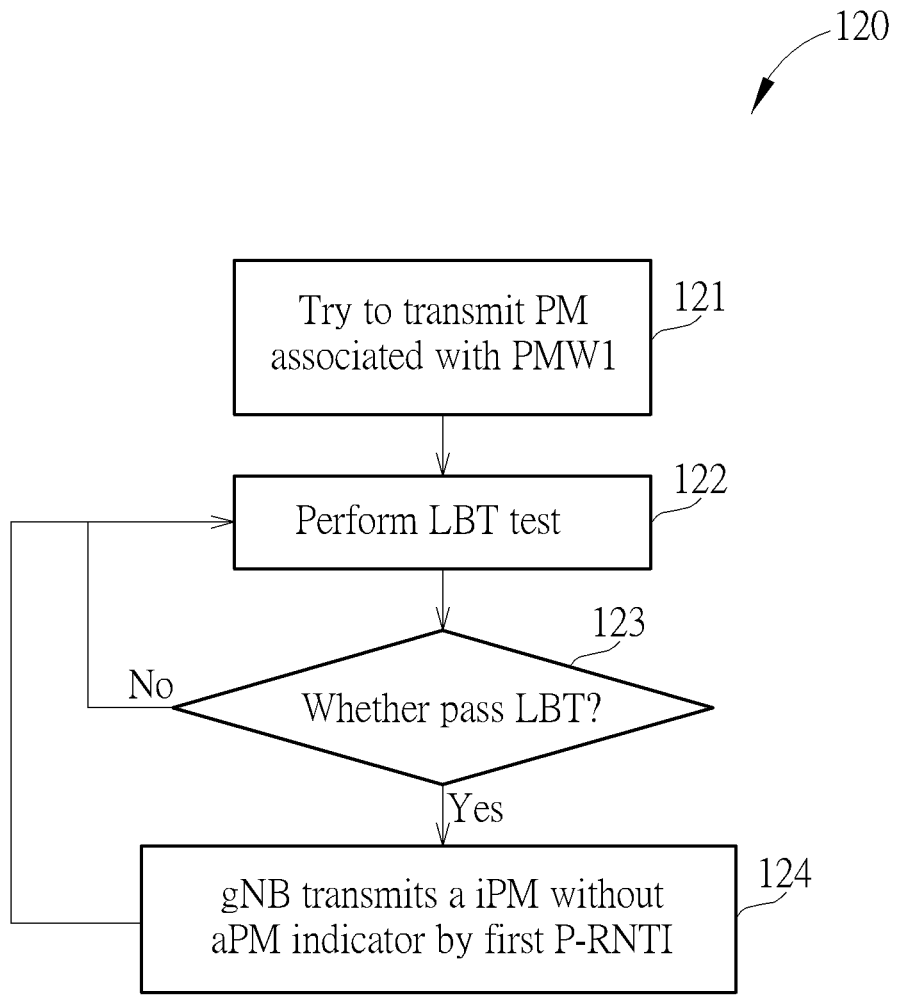
FIG. 12 illustrates a flowchart of an exemplary process according to the third embodiment of the present invention.

Please refer to FIG. 12, which illustrates a flowchart of an exemplary process 120 according to the third embodiment of the present invention. The process 120 is utilized in a gNB of a wireless communication system for paging message delivering at the time interval T1 without overlapping PMW. The process 120 may be compiled into a program code and includes the following steps:

Step 121: Try to transmit an iPM associated with a paging monitor window.

Step 122: Perform a listen before talk test.

Step 123: Determine whether the listen before talk test has passed. Go to Step 124 if yes; return to Step 122 if no.

Step 124: Use a first P-RNTI to transmit the iPM without an aPM indicator.

Please further refer to FIG. 11 and FIG. 12 together. Within the time interval T1 that the paging monitor window PMW1 does not overlap with any PMW, therefore a number of paging records carried by the paging message may not exceed the maximum number. In Step 121, the gNB may try to transmit an iPM associated with the paging monitor window PMW1. From Step 122 to Step 124, the gNB may use a first P-RNTI to transmit the iPM without an aPM indicator because the number of paging records carried by the iPM may not exceed the maximum number. In Step 124, the iPM only carries the paging records associated with the paging monitor window PMW1.

In an example of the third embodiment, the aPM may be the same with the iPM, and the UE may use the same P-RNTI to receive both the iPM and the following aPM. For example, the gNB may repeatedly transmit the iPM associated with the paging monitor window PMW1, which is beneficial for paging reliability.

Figure 13:
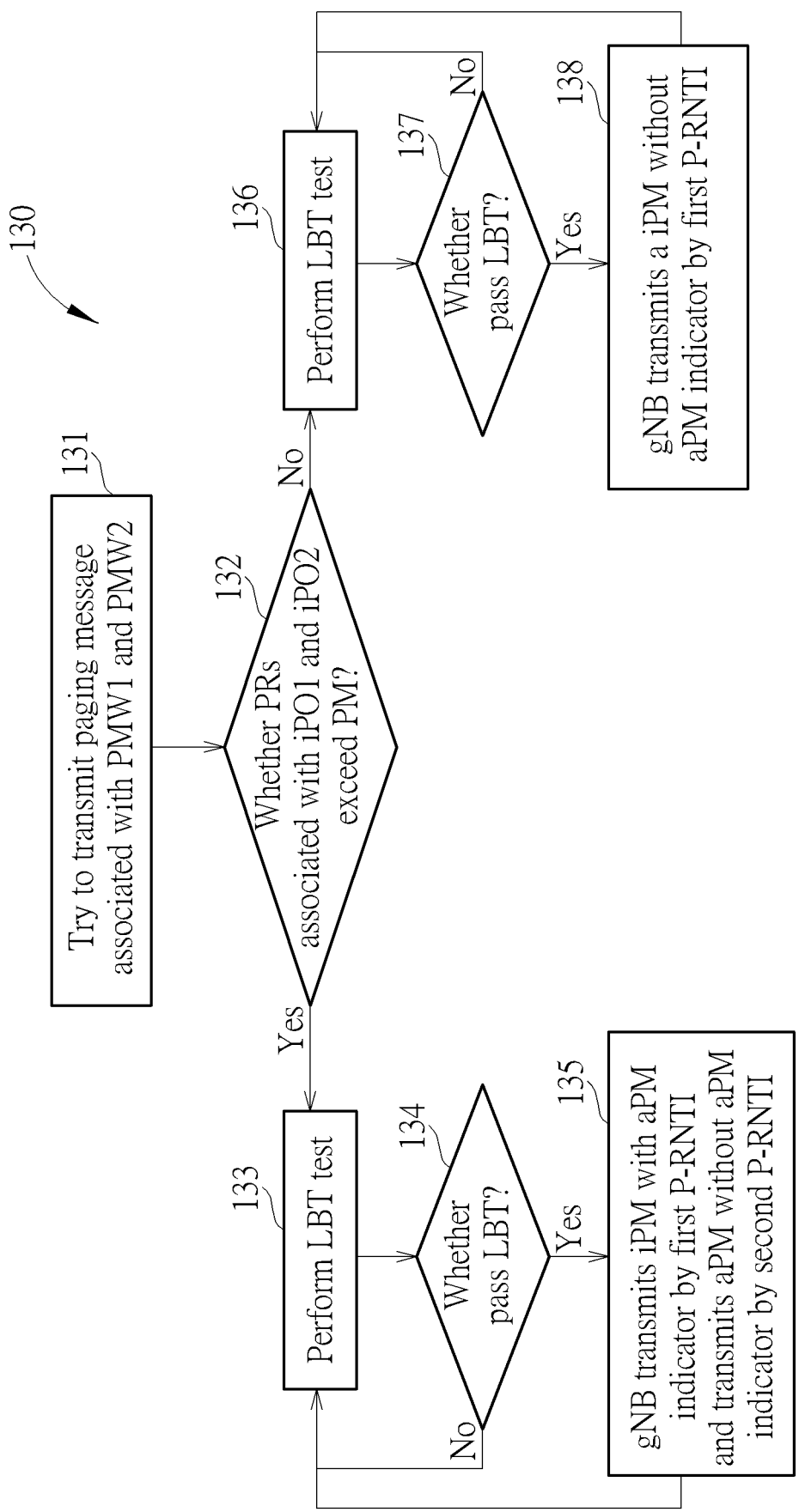
FIG. 13 illustrates a flowchart of an exemplary process according to an embodiment of the present invention.

Please refer to FIG. 13, which illustrates a flowchart of an exemplary process 130 according to the third embodiment of the present invention. The process 130 is utilized in a gNB of a wireless communication system for paging message delivering at the time interval T2 with overlapping PMWs. The process 130 may be compiled into a program code and includes the following steps:

Step 131: Try to transmit an iPM associated with PMW1 and PMW2.

Step 132: Determine whether paging records associated with PMW1 and PMW2 exceed a maximum number. Go to Step 133 if yes; go to Step 136 if no.

Step 133: Perform a listen before talk test.

Step 134: Determine whether the listen before talk test has passed. Go to Step 135 if yes; return to Step 133 if no.

Step 135: Use a first P-RNTI to transmit the iPM with an aPM indicator, and use a second P-RNTI to transmit an aPM without the aPM indicator.

Step 136: Perform a listen before talk test.

Step 137: Determine whether the listen before talk test has passed. Go to Step 138 if yes; return to Step 136 if no.

Step 138: Use the first P-RNTI to transmit the iPM without the aPM indicator.

For example, please refer to FIG. 11 and FIG. 13 together, within the time interval T2 that the paging monitor windows PMW1 and PMW2 are overlapped, therefore the number of paging records carried by the iPM may or may not exceed the maximum number.

In Step 131 to Step 135, when the number of paging records carried by the paging message exceeds the maximum number in the time interval T2, the gNB may use the first P-RNTI to transmit the iPM with an aPM indicator, and use the second P-RNTI to transmit the aPM without the aPM indicator. In Step 135, the iPM may carry the paging records associated with the paging monitor windows PMW1 and PMW2, and the aPM may carry the rest paging records which cannot be carried by the iPM.

In Steps 131, 132, 136 to 138, when the number of paging records carried by the iPM does not exceed the maximum number in the time interval T2, the gNB may use the first P-RNTI to transmit the iPM without the aPM indicator. In Step 138, the iPM may carry the paging records associated with the paging monitor windows PMW1 and PMW2.

Figure 14:
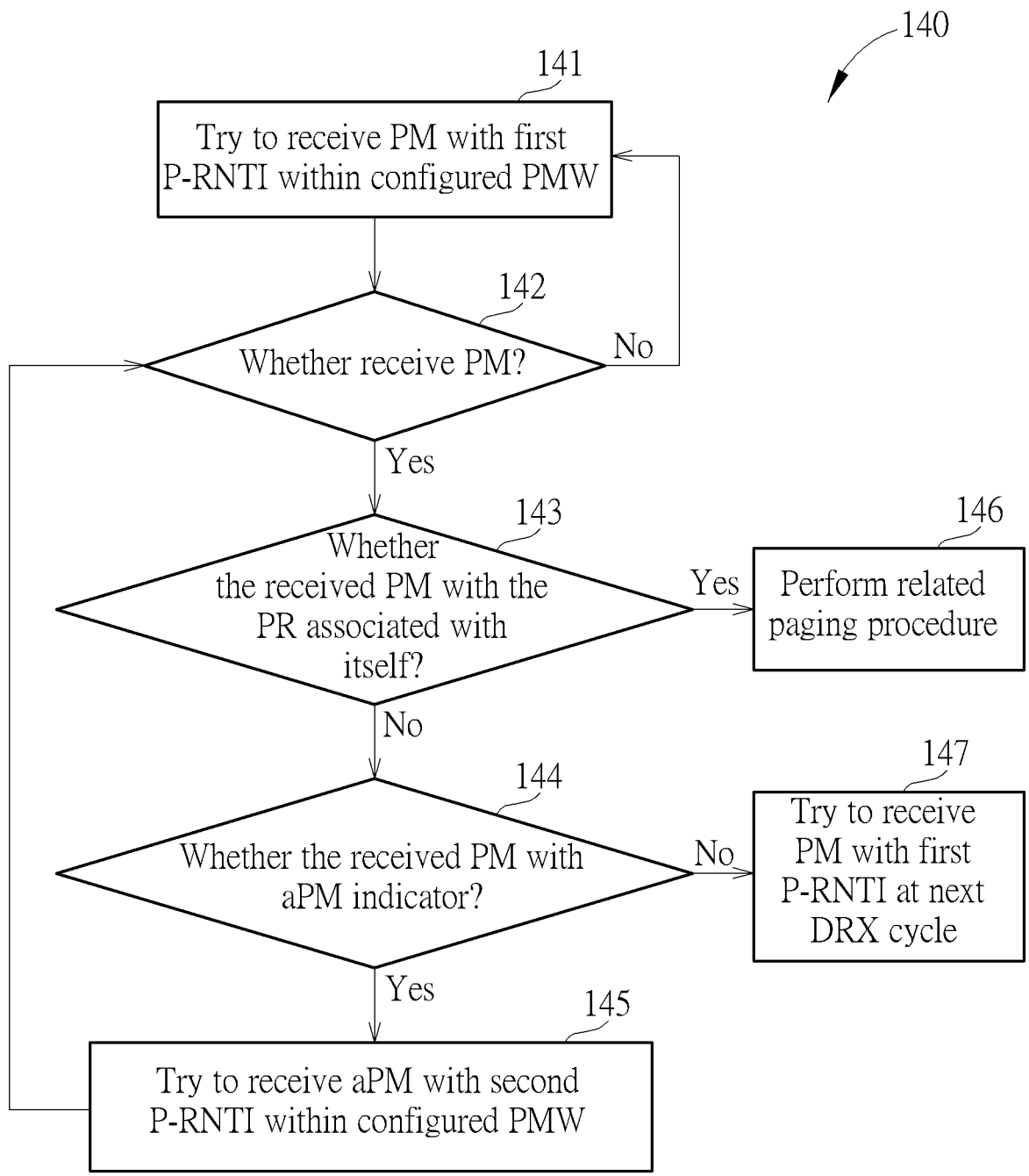
FIG. 14 illustrates a flowchart of an exemplary process according to the third embodiment of the present invention.

Please refer to FIG. 14, which illustrates a flowchart of an exemplary process 140 according to the third embodiment of the present invention. The process 140 is utilized in a UE of a wireless communication system for paging message reception at the time intervals T1 and T2. The process 140 may be compiled into the program code 314 and includes the following steps:

Step 141: Try to use a first P-RNTI to receive an iPM within a configured paging monitor window.

Step 142: Determine whether the iPM has been received. Go to Step 143 if yes; return to Step 141 if no.

Step 143: Determine whether there is a paging record carried by the iPM associated with itself. Go to Step 146 if yes; go to Step 144 if no.

Step 144: Determine whether there is an aPM indicator carried by the iPM. Go to Step 145 if yes; go to Step 147 if no.

Step 145: Try to use a second P-RNTI to receive an aPM within the configured paging monitor window. Return to Step 142.

Step 146: Perform a paging procedure related to the paging record.

Step 147: Try to use the first P-RNTI to receive another paging message at a next DRX cycle.

For example, please refer to FIG. 11 and FIG. 14 together, within the time intervals T1 and T2, the UEs configured with the paging monitor windows PMW1 and PMW2 may behave the same to receive the iPM and the aPM.

In Step 141, 142 and 143, the UE may use the first P-RNTI to receive a paging message (iPM or aPM) to see if there is a paging record associated with itself. In Step 144, when the UE finds that there is no paging record associated with itself, the UE may look for an aPM indicator.

In Step 145, when the UE finds the aPM indicator from the received paging message, the UE may try to receive the aPM at the configured paging monitor window. In an example of the third embodiment, the UE may use a second P-RNTI to receive the aPM.

In Step 146, the UE may perform a related paging procedure when it finds that a paging record carried by the received paging message (initial or aPM) is associated with itself.

In Step 147, when the UE does not find any paging record that is associated with itself and either the aPM indicator from the received paging message, the UE may try to use the first P-RNTI to receive a paging message at the next DRX cycle.

Figure 15:
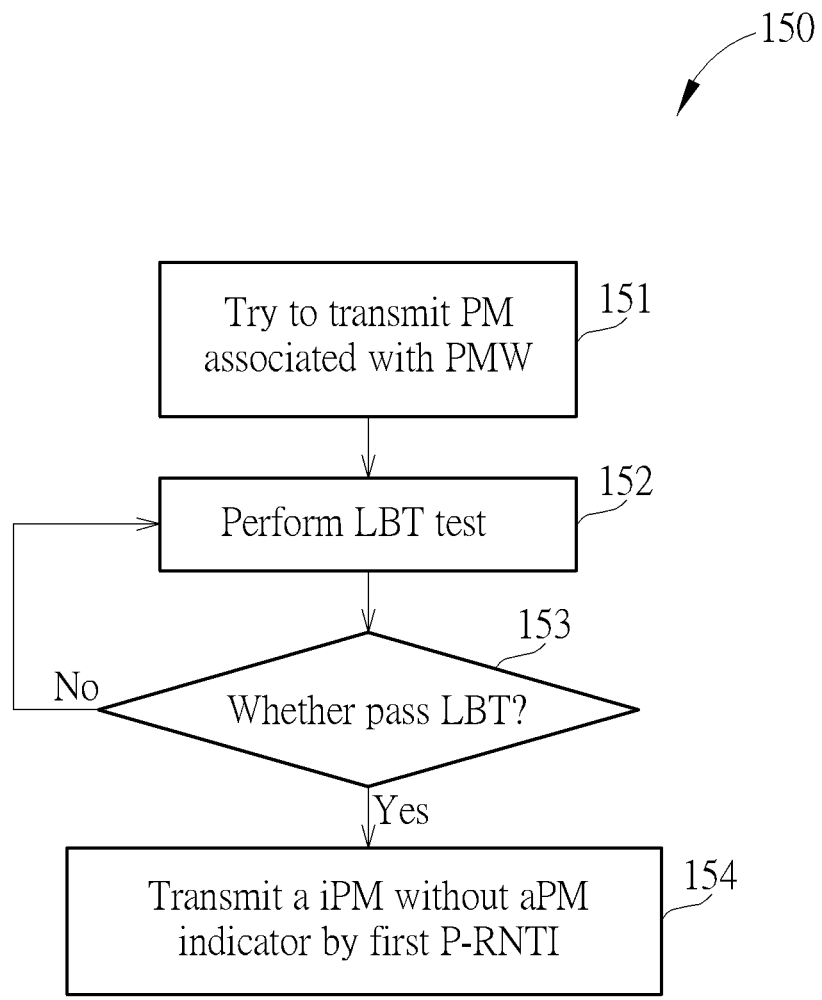
FIG. 15 illustrates a flowchart of an exemplary process according to the third embodiment of the present invention.

Please refer to FIG. 15, which illustrates a flowchart of an exemplary process 150 according to the third embodiment of the present invention. The process 150 is utilized in a gNB of a wireless communication system for paging message delivering at the time interval T1 without overlapping PMW. The process 150 may be compiled into a program code and includes the following steps:

Step 151: Try to transmit an iPM associated with a PMW.

Step 152: Perform a listen before talk test.

Step 153: Determine whether the listen before talk test has passed. Go to Step 154 if yes; return to Step 152 if no.

Step 154: Use a first P-RNTI to transmit the iPM without an aPM indicator.

For example, please refer to FIG. 11 and FIG. 15 together, within the time interval T1 that the paging monitor window PMW1 does not overlap with any PMW, therefore a number of paging records carried by the paging message may not exceed the maximum number. In Step 151, the gNB may try to transmit an iPM associated with the paging monitor window PMW1. From Step 152 to Step 154, the gNB may use a first P-RNTI to transmit the iPM without an aPM indicator because the number of paging records carried by the iPM may not exceed the maximum number. In Step 154, the iPM only carries the paging records associated with the paging monitor window PMW1.

Figure 16:
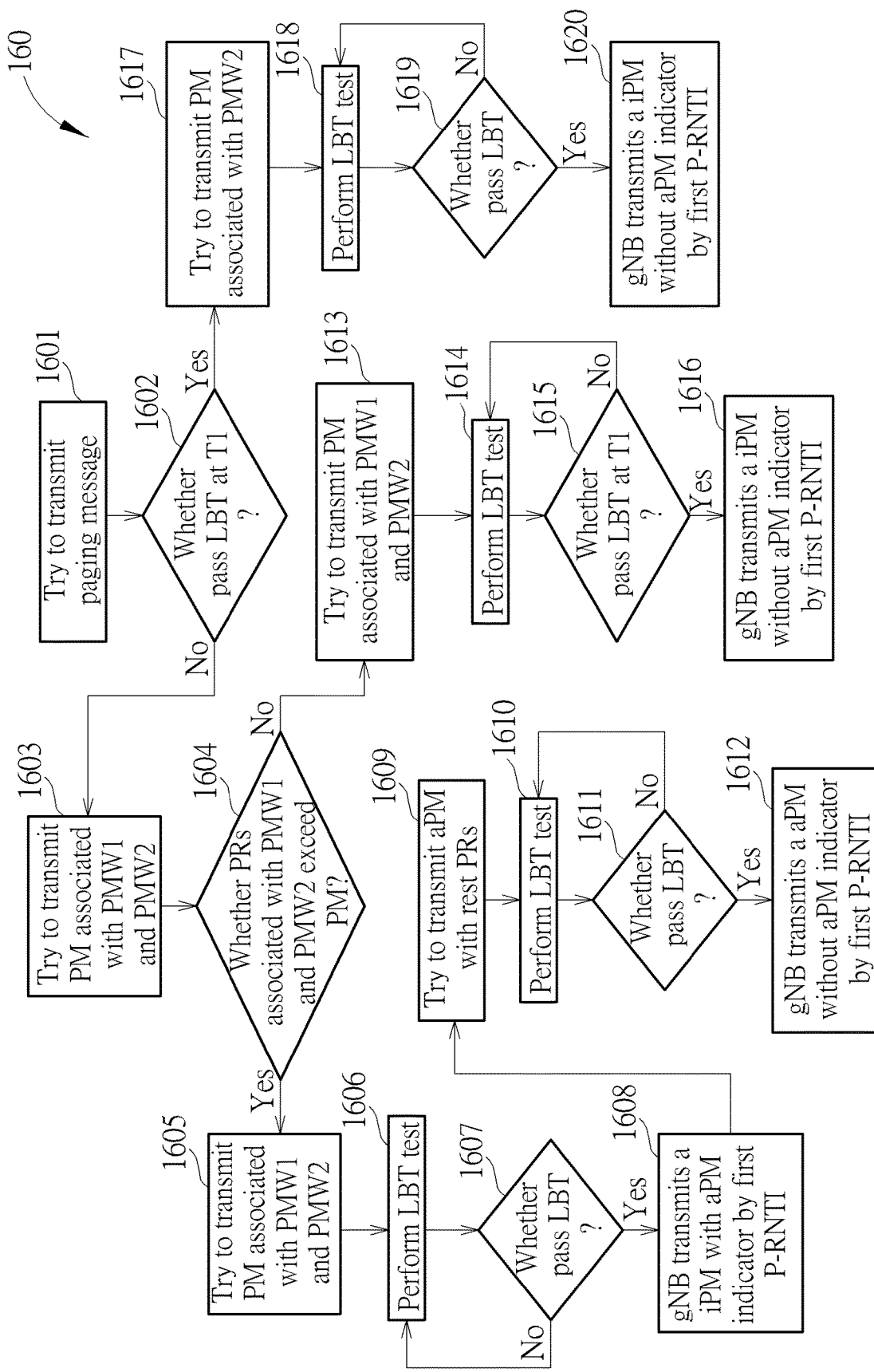
FIG. 16 illustrates a flowchart of an exemplary process according to the third embodiment of the present invention.

Please refer to FIG. 16, which illustrates a flowchart of an exemplary process 160 according to the third embodiment of the present invention. The process 160 is utilized in a gNB of a wireless communication system for paging message delivering at the time interval T2 with overlapping PMWs. The process 160 may be compiled into a program code and includes the following steps:

Step 1601: Try to transmit an iPM.

Step 1602: Determine whether a listen before talk test has passed in a previous time interval. Go to Step 1617 if yes; go to Step 1603 if no.

Step 1603: Try to transmit an iPM associated with paging monitor windows PMW1 and PMW2.

Step 1604: Determine whether a number of paging records associated with the paging monitor windows PMW1 and PMW2 exceeds a maximum number. Go to Step 1605 if yes; return to Step 1613 if no.

Step 1605: Try to transmit the iPM associated with the paging monitor windows PMW1 and PMW2.

Step 1606: Perform the listen before talk test.

Step 1607: Determine whether the listen before talk test has passed. Go to Step 1608 if yes; return to Step 1606 if no.

Step 1608: Use a first P-RNTI to transmit the iPM with an aPM indicator.

Step 1609: Try to transmit an aPM with rest paging records.

Step 1610: Perform the listen before talk test.

Step 1611: Determine whether the listen before talk test has passed. Go to Step 1612 if yes; return to Step 1610 if no.

Step 1612: Use the first P-RNTI to transmit the aPM without the aPM indicator.

Step 1613: Try to transmit the iPM associated with the paging monitor windows PMW1 and PMW2.

Step 1614: Perform the listen before talk test.

Step 1615: Determine whether the listen before talk test has passed. Go to Step 1616 if yes; return to Step 1614 if no.

Step 1616: Use the first P-RNTI to transmit the iPM without the aPM indicator.

Step 1617: Try to transmit the iPM associated with the paging monitor window PMW2.

Step 1618: Perform the listen before talk test.

Step 1619: Determine whether the listen before talk test has passed. Go to Step 1620 if yes; return to Step 1619 if no.

Step 1620: Use the first P-RNTI to transmit the iPM without the aPM indicator.

For example, please refer to FIG. 11 and FIG. 16 together, within the time interval T2 that the paging monitor windows PMW1 and PMW2 are overlapped, therefore the number of paging records carried by the iPM may or may not exceed the maximum number.

In Step 1601 to Step 1612, when the listen before talk test has passed in the time interval T1 and the number of paging records carried by the paging message exceeds the maximum number in the time interval T2, the gNB may use the first P-RNTI to transmit the iPM with an aPM indicator, and use the second P-RNTI to transmit the aPM without the aPM indicator.

In Step 1601, 1602, 1603, 1604, 1613, and 1614 to 1616, when the listen before talk test has passed in the time interval T1 and the number of paging records carried by the iPM does not exceed the maximum number in the time interval T2, the gNB may use the first P-RNTI to transmit the iPM without the aPM indicator.

In Step 1601, 1602, and 1617 to 1620, when the listen before talk test does not pass in the time interval T1, the gNB may try to transmit the iPM associated with the paging monitor window PMW2, and the gNB may use the first P-RNTI to transmit the iPM without the aPM indicator to the UE configured with the paging monitor window PMW2.

Figure 17:
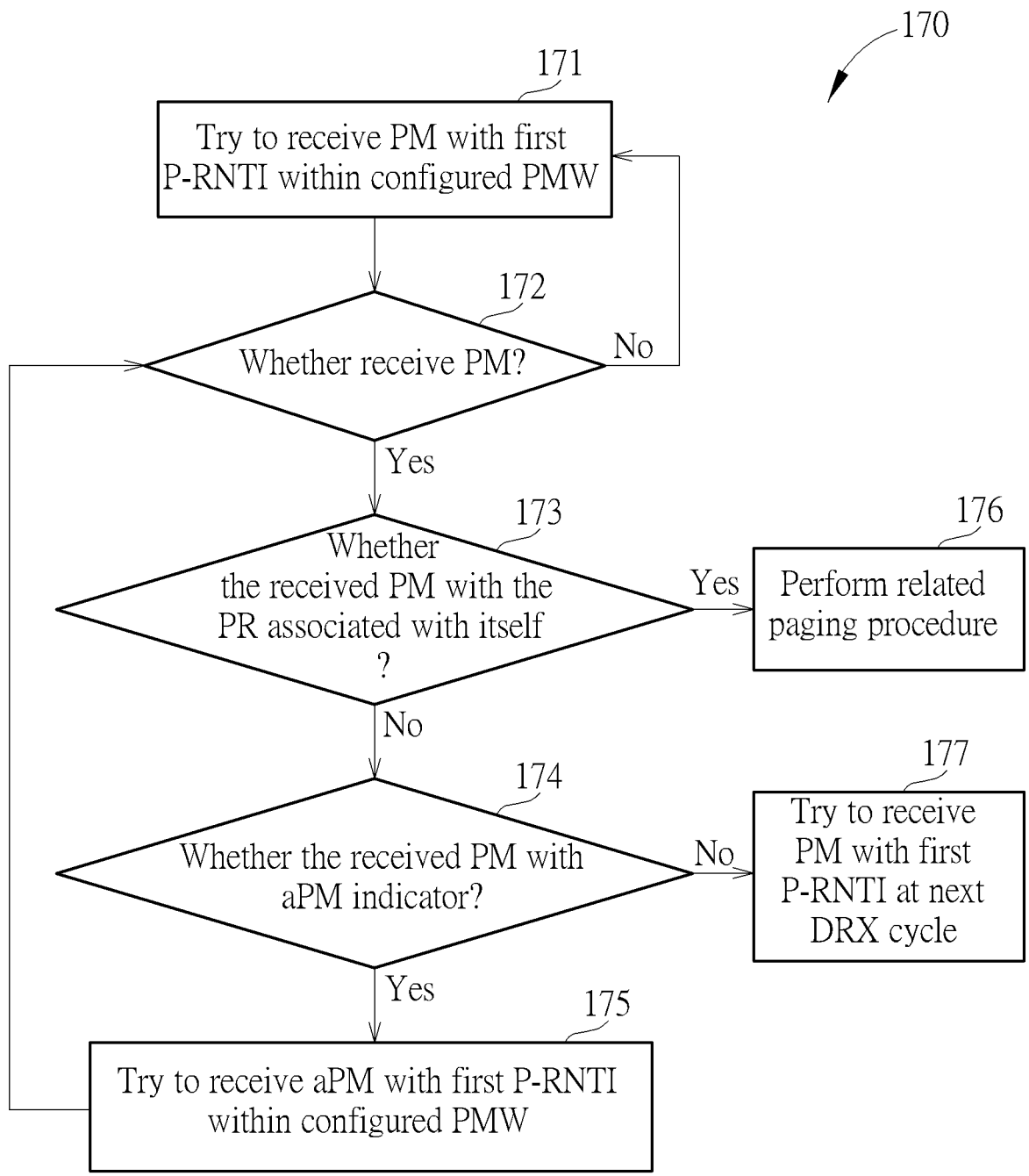
FIG. 17 illustrates a flowchart of an exemplary process according to the third embodiment of the present invention.

Please refer to FIG. 17, which illustrates a flowchart of an exemplary process 170 according to the third embodiment of the present invention. The process 170 is utilized in a UE of a wireless communication system for paging message reception at the time intervals T1 and T2. The process 170 may be compiled into the program code 314 and includes the following steps:

Step 171: Try to use a first P-RNTI to receive an iPM within a configured paging monitor window.

Step 172: Determine whether the iPM has been received. Go to Step 173 if yes; return to Step 171 if no.

Step 173: Determine whether there is a paging record carried by the iPM associated with itself. Go to Step 176 if yes; go to Step 174 if no.

Step 174: Determine whether there is an aPM indicator carried by the iPM. Go to Step 175 if yes; go to Step 177 if no.

Step 175: Try to use the first P-RNTI to receive an aPM during the configured paging monitor window. Return to Step 172.

Step 176: Perform a paging procedure related to the paging record.

Step 177: Try to use the first P-RNTI to receive another paging message at a next DRX cycle.

For example, please refer to FIG. 11 and FIG. 17 together, within the time intervals T1 and T2, the UEs configured with the paging monitor windows PMW1 and PMW2 may behave the same to receive the iPM and the aPM.

In Step 171, 172 and 173, the UE may use the first P-RNTI to receive a paging message (iPM or aPM) to see if there is a paging record associated with itself. In Step 174, when the UE finds that there is no paging record associated with itself, the UE may look for an aPM indicator.

In Step 175, when the UE finds the aPM indicator from the received paging message, the UE may try to receive the aPM within the configured paging monitor window. In an example of the third embodiment, the UE may use the first P-RNTI to receive the aPM.

In Step 176, the UE may perform a related paging procedure when it finds that a paging record carried by the received paging message (iPM or aPM) is associated with itself.

In Step 177, when the UE does not find any paging record that is associated with itself and either the aPM indicator from the received paging message, the UE may try to use the first P-RNTI to receive a paging message at the next DRX cycle.

In an example of the third embodiment, the iPM may indicate that the rest paging records belong to which PMW. For example, when the paging message within the duration T2 indicates that the rest paging records are associated with the paging monitor window PMW2, the UE configured with the paging monitor window PMW1 may determine not to receive the aPM within the configured paging monitor window. When the paging message within the duration T2 indicates that the rest paging records are associated with the paging monitor window PMW1, the UE configured with the paging monitor window PMW1 may determine to receive the aPM within the configured paging monitor window.

In an example of the third embodiment, the iPM may not further indicate whether there is any rest paging records carried by an aPM. The UE may try to receive another paging message in the configured PMW, even if it has received a paging message in the configured PMW. For example, in FIG. 11, the UE associated with the paging monitor window PMW1 should try to receive another paging message in the configured PMW, even if an iPM has been received and the paging message does not carry any paging record associated with the user equipment, which allows the UE to make full use of the configured PMW. In cast, once the UE is paged (for example, the UE finds its paging record within a paging message), the UE will perform normal paged procedure (for example, the UE may try to setup connection) and stop receiving any paging message in the configured PMW.

The present invention provides the first embodiment related to the use of additional paging frame and additional monitor occasion for NRUP (New Radio Unlicensed spectrum Paging), the second embodiment related to the use of multiple P-RNTIs (Paging Radio Network Temporary Identifiers) under overlapping paging monitor windows is disclosed, and the third embodiment related to the use of aPM indicator under overlapping paging monitor windows is disclosed. The UE and the gNB in the New Radio Unlicensed spectrum system may perform paging according to the embodiments of the present invention, which maximizes the paging capacity within the maximum number of the paging records.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A paging method for a user equipment in a New Radio Unlicensed spectrum (NR-U) system, wherein the user equipment is configured with a paging monitor window comprising a plurality of monitor occasions, comprising:
   determining locations of the plurality of monitor occasions, wherein the locations are within the paging monitor window of a discontinuous reception (DRX) cycle; and
   receiving a paging message at the plurality of monitor occasions within the paging monitor window;
   wherein the paging monitor window is overlapped with another paging monitor window configured for another user equipment in the NR-U system, and the plurality of monitor occasions configured for another user equipment are not overlapped with the plurality of monitor occasions within the paging monitor window.

2. The paging method of claim 1, wherein the plurality of monitor occasions are carried by one or more consecutive radio frames.

3. The paging method of claim 1, wherein the plurality of monitor occasions comprises an initial monitor occasion and one or more additional monitor occasion, and determining the locations of the plurality of monitor occasions comprises:
   determining the one or more additional monitor occasion respectively located at one or more slot with a same slot index of one or more radio frame.

4. The paging method of claim 1, wherein the plurality of monitor occasions comprises an initial monitor occasion and one or more additional monitor occasion, and determining the locations of the plurality of monitor occasions comprises:
   determining the one or more additional monitor occasion respectively located at one or more slot of a radio frame carrying the initial monitor occasion, wherein the one or more additional monitor occasion is tightly following the initial monitor occasion in the radio frame.

5. The paging method of claim 4, wherein determining the locations of the plurality of monitor occasions comprises:
   before determining the one or more additional monitor occasion located at the one or more slot, being configured with a number of the one or more additional monitor occasion;
   wherein the number of the one or more additional monitor occasion is not greater than available occasions that could be allocated between two consecutive initial monitor occasions in the radio frame.

6. The paging method of claim 1, wherein determining the locations of the plurality of monitor occasions comprises:
   determining a next one of the plurality of monitor occasions located at a slot with a slot index that is next to a previous slot index of a previous one of the plurality of monitor occasions.

7. The paging method of claim 1, wherein receiving the paging message at the plurality of monitor occasions comprises:
   using one or more paging radio network temporary identifiers (P-RNTIs) to receive the paging message for each one of the plurality of monitor occasions.

8. The paging method of claim 7, wherein the one or more P-RNTIs is preconfigured.

9. The paging method of claim 7, wherein the one or more P-RNTIs is configured by a received broadcast message, or configured by a received unicast message, the one or more P-RNTIs is included in a received P-RNTI list.

10. The paging method of claim 9, wherein one of the one or more P-RNTIs with an index (iMO_index mod N) is used to receive the paging message, wherein
    iMO_index is an index of the paging monitor window, and
    N is a total number of P-RNTIs included in the P-RNTI list.

11. The paging method of claim 9, wherein the paging monitor window is (i_s+d* system frame number of the initial paging frame), wherein
    i_s is an index of the paging monitor window, and
    d is a duration of the paging monitor window.

12. The paging method of claim 7, wherein the paging message comprises an additional paging message indicator which indicates whether the user equipment needs to receive an additional paging message.

13. The paging method of claim 12, further comprising:
    after receiving the paging message at the plurality of monitor occasions, by using a first P-RNTI of the one or more P-RNTIs,
    using a second P-RNTI of the one or more P-RNTIs to receive the additional paging message within the paging monitor window when the paging message does not carry any paging record associated with the user equipment.

14. The paging method of claim 12, further comprising:
    after receiving the paging message at plurality of monitor occasions by using a first P-RNTI of one or more P-RNTIs, using the first P-RNTIs to receive the additional paging message within the paging monitor window when the paging message does not carry any paging record associated with the user equipment.

15. The paging method of claim 12, wherein the paging message indicates that rest paging records carrying by the additional paging message is associated with one or more paging monitor window, the paging method further comprising:

after receiving the paging message at the plurality of monitor occasions, determining to receive the additional paging message when the paging message indicates that the rest paging records is associated the paging monitor window that is associated with the user equipment; or determining not to receive the additional paging message when the paging message indicates that the rest paging records is associated another paging monitor window that is not associated with the user equipment.

16. The paging method of claim 1, further comprising:

after receiving the paging message at the plurality of monitor occasions, receiving one or more additional paging message within the paging monitor window when the paging message has been received and the paging message does not carry any paging record associated with the user equipment.

* * * * *